(No Model.)

T. R. FERRALL.
HOISTING BLOCK.

No. 511,766. Patented Jan. 2, 1894.

WITNESSES:
J. S. Finch.
A. J. Tanner.

INVENTOR
Thos. R. Ferrall
BY
P. S. Smith Jr.
ATTORNEY

UNITED STATES PATENT OFFICE.

THOMAS R. FERRALL, OF BRIDGEPORT, ASSIGNOR TO THE UNION HARDWARE COMPANY, OF TORRINGTON, CONNECTICUT.

HOISTING-BLOCK.

SPECIFICATION forming part of Letters Patent No. 511,766, dated January 2, 1894.

Application filed April 11, 1893. Serial No. 469,928. (No model.)

*To all whom it may concern:*

Be it known that I, THOMAS R. FERRALL, a citizen of the United States, residing at Bridgeport, in the county of Fairfield and State of Connecticut, have invented certain new and useful Improvements in Hoisting-Blocks; and I do hereby declare the following to be a full, clear, and exact description of the invention, such as will enable others skilled in the art to which it appertains to make and use the same.

My invention relates to certain new and useful improvements in hoisting blocks, and has for its objects to lighten the block without impairing its strength, to prevent the sheave from cutting into the housing, and to provide a superior side bearing for said sheave, which bearing shall be separate from the housing and readily detachable.

My invention consists mainly in providing independent detachable bearings at the sides of the sheave, against which bearings the side thrust of the sheave is exerted.

In order that those skilled in the art to which my invention appertains may more fully understand its nature, I will describe the same in detail, reference by numbers being had to the accompanying drawings, which form a part of this specification, and in which—

Figure 1:
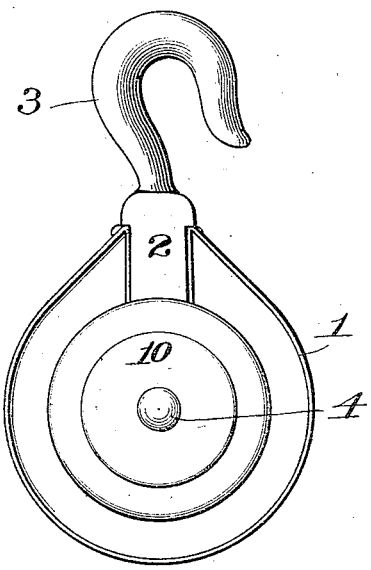
Figure 2:
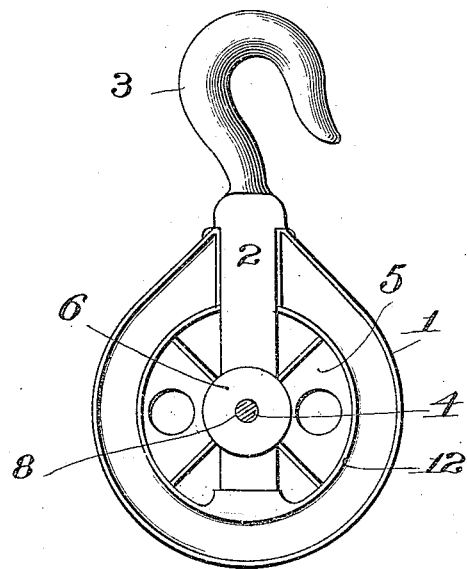
Figure 3:
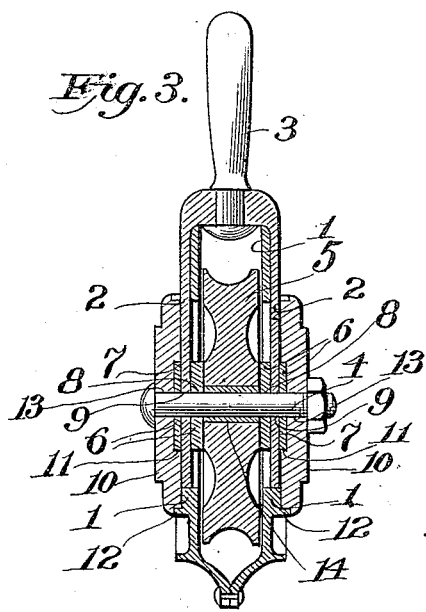
Figure 4:
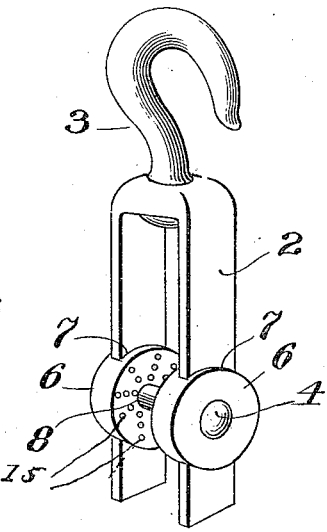
Figure 5:
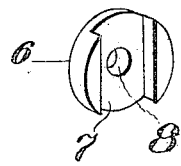

Figure 1, is a side elevation of my improved hoisting block complete; Fig. 2, a similar view with the cheek piece removed; Fig. 3, a central vertical section; Fig. 4, a detail perspective showing the strap, the side bearings and the pivot pin, in the proper relative position which they occupy when assembled within the completed block, and Fig. 5, is a detail perspective of a modified form of the side bearing.

Similar numbers of reference denote like parts in the several figures of drawings.

Heretofore, in hoisting blocks, the side bearings for the sheave have been made integral with the housing, and in some instances a washer has been interposed between such bearings and the sheave, but in such cases it has invariably happened that the bearings have been cut into by the sheave, the washer affording little if any protection. When this happens, the block is comparatively useless, since the friction which opposes the free revolution of the sheave becomes very great, and it is a matter of considerable expense to repair the block so as to make it serviceable.

My invention provides for the removal of these side bearings, either for the purpose of substituting new bearings, or for repairing the old ones, and will be best understood from the following description:

1 is the housing, 2 the strap having at the top the usual hook 3, and 4 is the pin on which the sheave 5 revolves.

6 are the side bearings, consisting of round blocks of gun metal, vulcanized fiber, or in fact any material suitable for the purpose of bearings. These blocks have gates 7 extending therethrough for the accommodation of the strap 2, and perforations 8 at their centers from side to side, which perforations register with perforations 9 in the strap, when said blocks and strap are properly assembled, in order that the pin 4 may be inserted therethrough, all of which will be hereinafter more fully explained.

In assembling the parts of my improved hoisting block, the strap 2 is first placed in position, the two legs of said strap being inserted through the gates in the blocks 6, the sheave is introduced within the housing, and the pin 4 is inserted through the perforations in the blocks and strap and the axial aperture in the sheave.

10 are cheek-pieces recessed at 11 in their inner faces to accommodate the outer portions of the blocks 6, and confined within annular flanged seats 12 at the outside of the housing, the object of such pieces being to retain the parts in proper position within the housing. These pieces also have each a perforation 13 through which the pin is passed, the latter being secured outside such pieces in the usual manner.

If desired, a bushing 14 may be interposed between the sheave and pin, as seen at Fig. 3, and any suitable lubricant, as for instance black-lead, may be applied in any ordinary way to the inner faces of the blocks 6, as shown at Fig. 4 and designated by the reference number 15. The pin does not revolve with the sheave, as is the case with most devices of this sort, and therefore all the side thrust is thrown against the blocks 6. It will thus be seen that these blocks 6 are supported and held in position, with respect to the sheave, by the strap and pin, and in order to remove such blocks it is merely necessary to withdraw the pin and pull out the strap. The bearing blocks are therefore entirely independent of the housing, and the latter is accordingly open at each side, thus cheapening and lightening the hoisting block without impairing its strength. The cheek plates 10 are, for these reasons, preferably made of wood. It is not necessary that the gates in the bearing blocks should be closed on the outside since they may be cut through the outer face of the block, as shown in Fig. 5, the gist of my invention resting in the broad idea of providing independent removable side bearings for the sheave, and not in any particular manner of forming such bearings with reference to their assembly or securing of the same in proper position.

Having thus described my invention and particularly pointed out the advantages and salient features thereof, what I claim as new, and desire to secure by Letters Patent, is—

1. A hoisting block comprising a housing, an axial pin, a sheave loose thereon, the strap, the side bearing blocks for the sheave pin, the strap passing through recesses in the blocks, and the latter being independent of support by the housing.

2. A hoisting block comprising a strap, a housing arranged inside thereof, a pin, a sheave loose thereon and bearing blocks embracing the strap and supported independently of the housing.

3. In a hoisting block, the combination of the strap, the sheave, the axial pin extending through said strap and sheave, means—as cheek plates in the sides of the housing—for securing such parts in proper position within the housing, and the side bearing blocks for the sheave held in position by said strap and pin, substantially as set forth.

In testimony whereof I affix my signature in presence of two witnesses.

THOMAS R. FERRALL.

Witnesses:
T. W. SMITH, Jr.,
A. J. TANNER.